(12) United States Patent
Hathorn et al.

(10) Patent No.: US 7,500,030 B2
(45) Date of Patent: Mar. 3, 2009

(54) CONTROL OF INFORMATION UNITS IN FIBRE CHANNEL COMMUNICATIONS

(75) Inventors: Roger Gregory Hathorn, Tucson, AZ (US); Matthew Joseph Kalos, Tucson, AZ (US); William Frank Micka, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 115 days.

(21) Appl. No.: 11/468,720

(22) Filed: Aug. 30, 2006

(65) Prior Publication Data

US 2008/0123681 A1   May 29, 2008

(51) Int. Cl.
*G06F 13/00* (2006.01)

(52) U.S. Cl. .................. 710/33; 710/29; 710/34; 709/211; 709/212; 709/225; 709/231; 709/237

(58) Field of Classification Search ............. 709/211, 709/212, 225, 231, 237
See application file for complete search history.

(56) References Cited

U.S. PATENT DOCUMENTS

| 4,170,038 | A |   | 10/1979 | Bouvier et al. | |
|---|---|---|---|---|---|
| 5,526,484 | A | * | 6/1996 | Casper et al. | ........... 709/237 |
| 6,920,537 | B2 |   | 7/2005 | Ofek et al. | |
| 2001/0027486 | A1 |   | 10/2001 | Takamoto et al. | |
| 2003/0088638 | A1 |   | 5/2003 | Gluck et al. | |
| 2006/0004765 | A1 |   | 1/2006 | Anderson et al. | |

OTHER PUBLICATIONS

Lin, et al., "Performance of High-Speed Network I/O Subsystems: Case Study of a Fibre Channel Network", IEEE, 1994, pp. 174-183.
"Fibre Channel Single-Byte Command Code Sets-3 Mapping Protocol", NCITS working draft proposed American National Standard for Information Technology, Mar. 26, 2003, pp. 1-206.
"FICON Over Extended Distances", McData, 2005, pp. 1-6.
"DFSMS Extended Remote Copy Reference Information for Advanced Users", IBM Corporation, Document No. GC35-0482-01, Jun. 2002, pp. 1-106.
Warrick et al., "IBM TotalStorage Enterprise Storage Server: Implementing ESS Copy Services with IBM eServer zSeries", IBM Corporation, Document No. SG24-5680-04, Jul. 2004, pp. 1-502.
Warrick et al., "IBM TotalStorage Enterprise Storage Server: Implementing ESS Copy Services in Open Environments", IBM Corporation, Document No. SG24-5757-04, Jul. 2004, pp. 1-642.

(Continued)

*Primary Examiner*—Tariq Hafiz
*Assistant Examiner*—Jasjit S Vidwan
(74) *Attorney, Agent, or Firm*—Rabindranath Dutta; Konrad Raynes & Victor LLP (57) ABSTRACT

A primary storage control unit receives an information unit from a remote host over a fibre channel connection. The primary storage control unit adjusts an information unit pacing parameter included in a response sent from the primary storage control unit to the remote host, wherein the information unit pacing parameter indicates the number of information units that the remote host is allowed to send to the primary storage control unit without waiting for any additional response from the primary storage control unit.

10 Claims, 6 Drawing Sheets

OTHER PUBLICATIONS

"DFSMS Advanced Copy Services", IBM Corporation, Document No. SC35-0428-07, Apr. 2005, pp. 1-707.
"DFSMS Extended Remote Copy Installation Planning Guide", IBM Corporation, Document No. GC35-0481-00, pp. 1-56.

U.S. Application entitled "Persistent Information Unit Pacing", Serial No. unknown, filing date Aug. 30, 2006, IBM, by inventors Roger G. Hathorn, Daniel F. Casper, John Flanagan, and Catherine C. Huang.

* cited by examiner

FIG. 6 ns, in accordance with certain embodiments; and

CONTROL OF INFORMATION UNITS IN FIBRE CHANNEL COMMUNICATIONS

BACKGROUND

1. Field

The disclosure relates to a method, system, and article of manufacture for the control of information units in fibre channel communications.

2. Background

Fibre Channel refers to an integrated set of architectural standards for data transfer being developed by the American National Standards Institute. Fibre Connection (FICON) is a protocol of the fibre channel architecture and may also be referred to by the formal name of FC-SB3. Further details of FC-SB3 may be found in the publication, "FIBRE CHANNEL Single-Byte Command Code Sets-3 Mapping Protocol (FC-SB-3)", Rev. 1.6, published by the American National Standards for Information Technology on Mar. 26, 2003.

A channel is a direct or a switched point-to-point connection between communicating devices. In the Fibre Channel architecture, a FICON channel may perform the functions specified by FC-SB3 to provide access to Input/Output (I/O) devices by means of control units or emulated control units. FICON channels may rely on packet switching for transferring data between communicating devices.

A channel command word (CCW) is a control block which includes an I/O request, and may refer to a structure of a specific system architecture which specifies a command to be executed along with parameters. A channel program is a sequence of one or more channel command words executed sequentially that controls a specific sequence of channel operations. FICON channels may transmit up to sixteen channel command words at a time along with the associated data for any write operations, where a channel command word may be referred to as an "information unit". If more than sixteen information units are present in a channel program then after the transmission of the first sixteen information units the remaining information units may be transmitted in groups of eight until the channel program is completed.

Extended Remote Copy (XRC) is a copy function available for the z/OS* and OS/390* operating systems. XRC maintains a copy of the data asynchronously at a remote location, and can be implemented over extended distances, such as distances of over one hundred kilometers. XRC may be used in IBM Enterprise Storage Servers* (ESS). Further details of XRC may be found in the publication "IBM TotalStorage Enterprise Storage Server: Implementing ESS Copy Services with IBM eServer zSeries," published by International Business Machines Corporation, in July, 2004.

*z/OS, OS/390, and Enterprise Storage server are trademarks or registered trademarks of International Business Machines Corporation.

SUMMARY OF THE DESCRIBED EMBODIMENTS

Provided are a method, system, and article of manufacture, wherein a primary storage control unit receives an information unit from a remote host over a fibre channel connection. The primary storage control unit adjusts an information unit pacing parameter included in a response sent from the primary storage control unit to the remote host, wherein the information unit pacing parameter indicates the number of information units that the remote host is allowed to send to the primary storage control unit without waiting for any additional response from the primary storage control unit.

In certain additional embodiments, the information unit pacing parameter is set to a number that is greater than sixteen.

In further embodiments, the information unit is a channel command word in a fibre connect protocol, wherein the received channel command word starts a channel command word chain. A determination is made as to whether the channel command word comprises a define subsystem operation command that defines a subsystem operation for extended remote copy operations. A determination is made of the number of read record set commands associated with the define subsystem operation command, wherein a read record set command corresponds to a read request. The information unit pacing parameter is set to a value large enough to allow the remote host to send remaining information units without requiring the additional response from the primary storage control unit.

In yet further embodiments, the information unit is a channel command word in a fibre connect protocol, wherein the received channel command word starts a channel command word chain. A determination is made as to whether the channel command word comprises a define subsystem operation command that defines a subsystem operation for extended remote copy operations. The information unit pacing parameter is set to zero, in response to determining that the channel command word does not comprise a define subsystem operation command, wherein by setting the information unit pacing parameter to zero a default information unit pacing credit is used in the fibre channel connect protocol used for communicating between the remote host and the primary storage control unit.

In still further embodiments, the remote host performs extended remote copying of data from the primary storage control unit to a remote storage control unit, wherein the remote host is geographically separated from the primary storage control unit by a distance of over a hundred kilometers.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

A flow control method referred to as "information unit pacing" in the FICON architecture, may restrict a FICON channel to have at most sixteen information units in flight at any point in time. A channel program may request a command response information unit by setting the command response request (CRR) bit in the eighth information unit from the control unit, another 8 information units are sent. This may causes data rate droop at extended distance, such as distances beyond a hundred kilometers, because the control unit must receive the first group of 16 information units before requesting additional units according to the FICON pacing protocol, thus adding additional round trips of communication between the channel and control unit ports. The number of round trips depends on the size of a channel command word chain. If there are 150 channel command words in a channel command word chain, then there may be up to 17 round trips. At extended distances, such as distances beyond a hundred kilometers, a significant overhead may be added for the additional round trips of communication.

Certain embodiments allow a primary storage control unit to modify the flow of information units within the FICON architecture, such that more than sixteen information units can be in flight at any point in time. In extended distance remote copy implementations using FICON in a fibre channel network, a remote host may perform extended distance remote copy operations to copy data from a primary storage control unit to a remote storage control unit. By allowing more than sixteen information units to be in flight at a given point in time, certain embodiments may reduce the time for performing extended remote copy in comparison to situations where a channel is restricted to have no more than sixteen information units in flight at any point in time.

Figure 1:
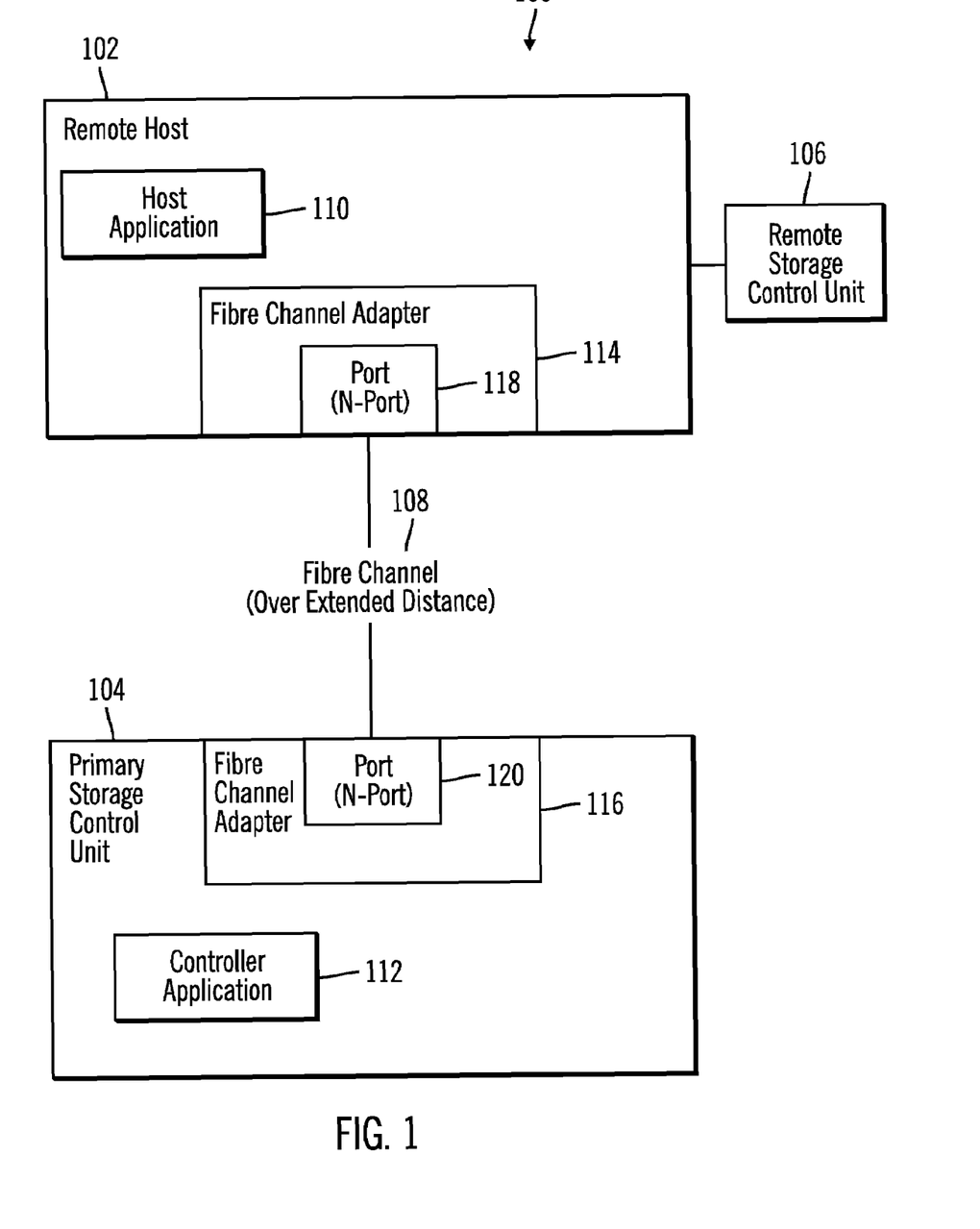
FIG. 1 illustrates a block diagram of a computing environment in accordance with certain embodiments.

FIG. 1 illustrates a block diagram of a computing environment 100 utilizing a remote host 102 coupled to a primary storage control unit 104 and a remote storage control unit 106. While FIG. 1 shows only a single remote host 102, a single primary storage control unit 104, and a single remote storage control unit 106, in certain alternative embodiments a plurality of remote hosts may be coupled to a plurality of primary and remote storage control units.

The remote host 102 may connect to the primary storage control unit 104 through a data interface channel, such as fibre channel 108 or any other data interface mechanism known in the art. The remote host 102 may be any suitable computational device presently known in the art, such as a personal computer, a workstation, a server, a mainframe, a hand held computer, a telephony device, a network appliance, etc. The remote host 102 may include any operating system known in the art, such as, the IBM OS/390 or the z/OS operating system.

The primary storage control unit 104 and the remote storage control unit 106 may include a plurality of logical volumes. The primary storage control unit 104 and the remote storage control unit 106 may control a plurality of physical storage devices, each of which may include one or more physical volumes.

The remote host 102 may include a host application 110 and the primary storage control unit 104 may include a controller application 112. The host application 110 interfaces with the controller application 112 to read data from the primary storage control unit 104 and store the data in the remote storage control unit 106. The host application 110 and the controller application 112 communicates over the fiber channel 108. In certain embodiments the host application 110 uses extended remote copy over the fiber channel 108 to copy data from the primary storage control unit 104 to the remote storage control unit 106.

Communications over the fibre channel 108 between the remote host 102 and the primary storage control unit 104 may be enabled by a fibre channel adapter 114 included in the remote host 102 and a fibre channel adapter 116 included in the primary storage control unit 104. The fibre channel adapter 114 included in the remote host 102 includes a port 118, and the fibre channel adapter 116 included in the primary storage control unit 104 includes a port 120, where the ports 118 and 120 may be referred to as N-ports in fibre channel terminology. Fibre channel based communications via the FICON protocol may be performed between the port 118 of the remote host 102 and the port 120 of the primary storage control unit 104.

Therefore, FIG. 1, illustrates a computing environment 100 in which the host application 110 copies data from the primary storage control unit 104 to the remote storage control unit 106 via the FICON protocol using extended remote copy operations. In certain embodiments the distance between the remote host 102 and the primary storage control unit 104 may exceed maximum distances supported by fibre channel architecture by using fibre channel extension solutions.

Figure 2:
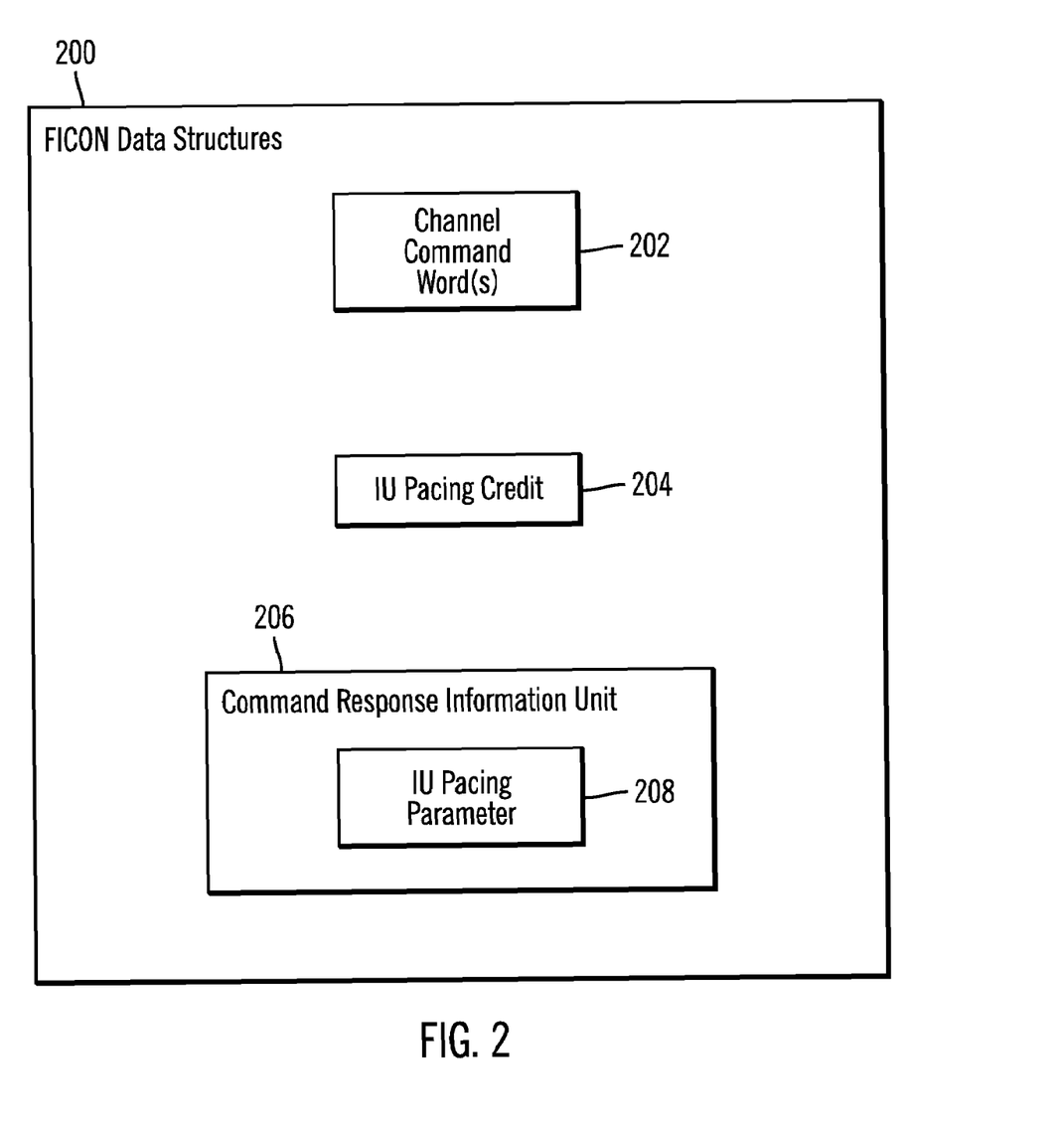
FIG. 2 illustrates data structures associated with a fibre connection, in accordance with certain embodiments.

FIG. 2 illustrates data structures associated with a fibre connection implemented over the fibre channel 108 in the computing environment 100, in accordance with certain embodiments. The data structures shown in FIG. 2 are referred to as FICON data structures 200.

The FICON data structures 200 include one or more channel command words 202, an information unit pacing credit 204, a command response information unit 206 having an information unit pacing parameter 208, where the information unit pacing parameter 208 is also referred to as an IU pacing parameter and the information unit pacing credit 204 may be referred to as a IU pacing credit.

The channel command words 202 are control blocks that include I/O requests. For example, in certain embodiments a channel command word 202 may include a read request from the host application 110 to the controller application 112, where the read request is a request for reading data stored by the primary storage control unit 104. A channel command word 202 may also be referred to as an information unit.

Each channel for fibre channel communications between the remote host 102 and the primary storage control unit 104 provides the IU pacing credit 204 which is initialized at either the start of each channel program or during a reconnection to continue the execution of a channel program. The IU pacing credit 204 is the maximum number of information units that the remote host 102 may send to the primary storage control unit 104, before the remote host 102 receives the command response information unit 206 from the primary storage control unit 104.

A command response information unit 206 is an information unit sent from the primary storage control unit 104 to the remote host 102, in response to certain conditions. For example, a command response information unit 206 may be sent from the primary storage control unit 104 to the remote host 102 in response to certain channel command words 202. The IU pacing parameter 208 associated with a command response information unit 206 may be sent from the port 120 of the primary storage control unit 104 to indicate the maximum number of information units the remote host 102 may send over a channel until the remote host 102 receives a new command response information unit from the primary storage control unit 104. An IU pacing parameter 208 of zero indicates that the primary storage control unit 104 prefers to leave the default value of the IU pacing credit 204 unchanged.

Therefore, FIG. 2 illustrates certain embodiments in which the IU pacing parameter 208 is set by the primary storage control unit 104 to control the flow of channel command words 202 from the remote host 102 to the primary storage control unit 104.

Figure 3:
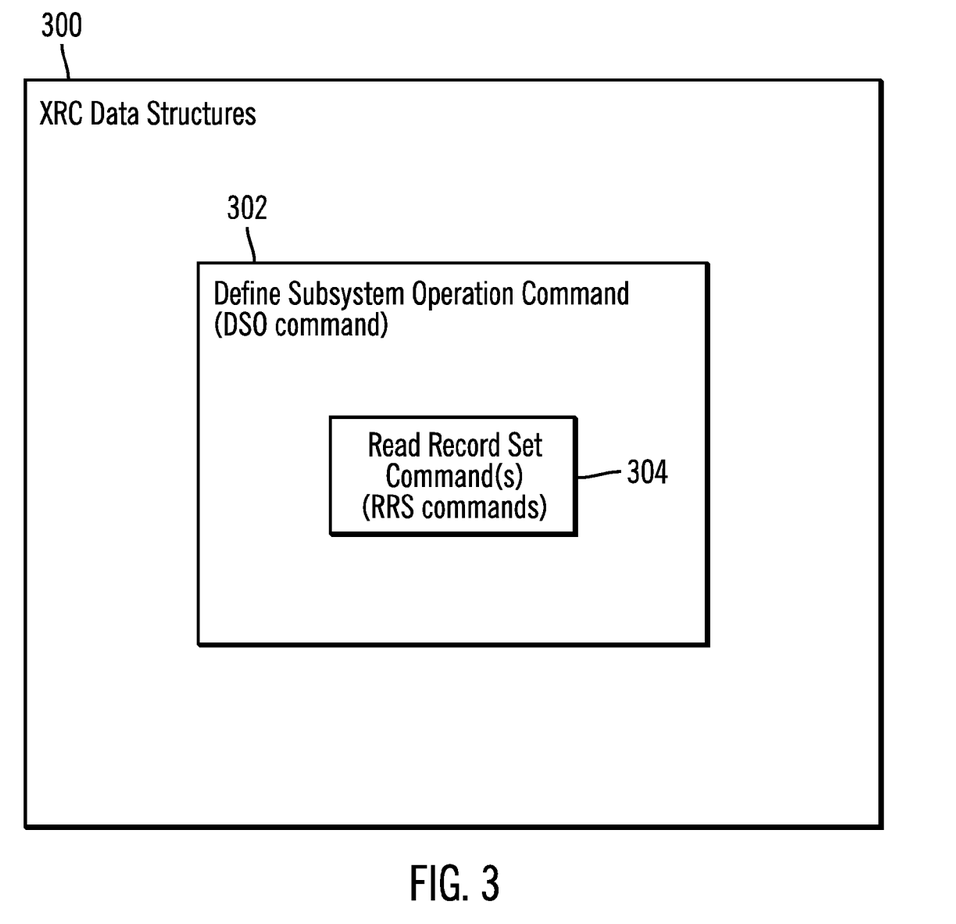
FIG. 3 illustrates data structures associated with extended remote copy, in accordance with certain embodiments.

FIG. 3 illustrates data structures associated with extended remote copy implemented in the computing environment 100, in accordance with certain embodiments. The data structures shown in FIG. 3 are referred to as XRC data structures 200.

The XRC data structures may include a define subsystem operating (DSO) command 302 that defines a subsystem operation signaling the intent to execute a number of Read Record Set (RRS) channel command words in the current command chain. During extended remote copy operations, the DSO command 302 may define a subsystem operation during communications between the remote host 102 and the primary storage control unit 104. The RRS command 304, if associated with the DSO command 302, indicates to the primary storage control unit 104 that the remote host 102 is sending a read request.

Extended distance XRC configurations may use fiber channel extension technologies between the remote host 102 and the primary storage control unit 104. Extended fibre channel may be used by the remote host 102 to read data from the primary storage control unit 104 and store the data on storage at the remote storage control unit 106. In certain embodiments the data read from the primary storage control unit 104 is stored as backup data in the remote storage control unit 106.

In certain embodiments, the remote host 102 issues command chains to the primary storage control unit 104, where the command chain includes a DSO command 302 followed by a series of read record set commands 304, and finally additional commands [e.g., Perform Subsystem Function (PSF) commands and Read Subsystem Data (RSSD) commands as defined in XRC] to determine the number of sidefile entries for the next chain. The count of RRS commands 304 in the chain is indicated in the DSO command parameters, and in certain exemplary embodiments the count of RRS commands 304 may exceed 150 channel command words.

Therefore, FIG. 3 illustrates certain embodiments in which a read record set command 304 associated with a DSO command 302 indicates to the primary storage control unit 104 that read operations are requested by the remote host 102. Such DSO commands 302 may be sent from the remote host 102 to the primary storage control unit 104 in embodiments that implement extended remote copy.

Figure 4:
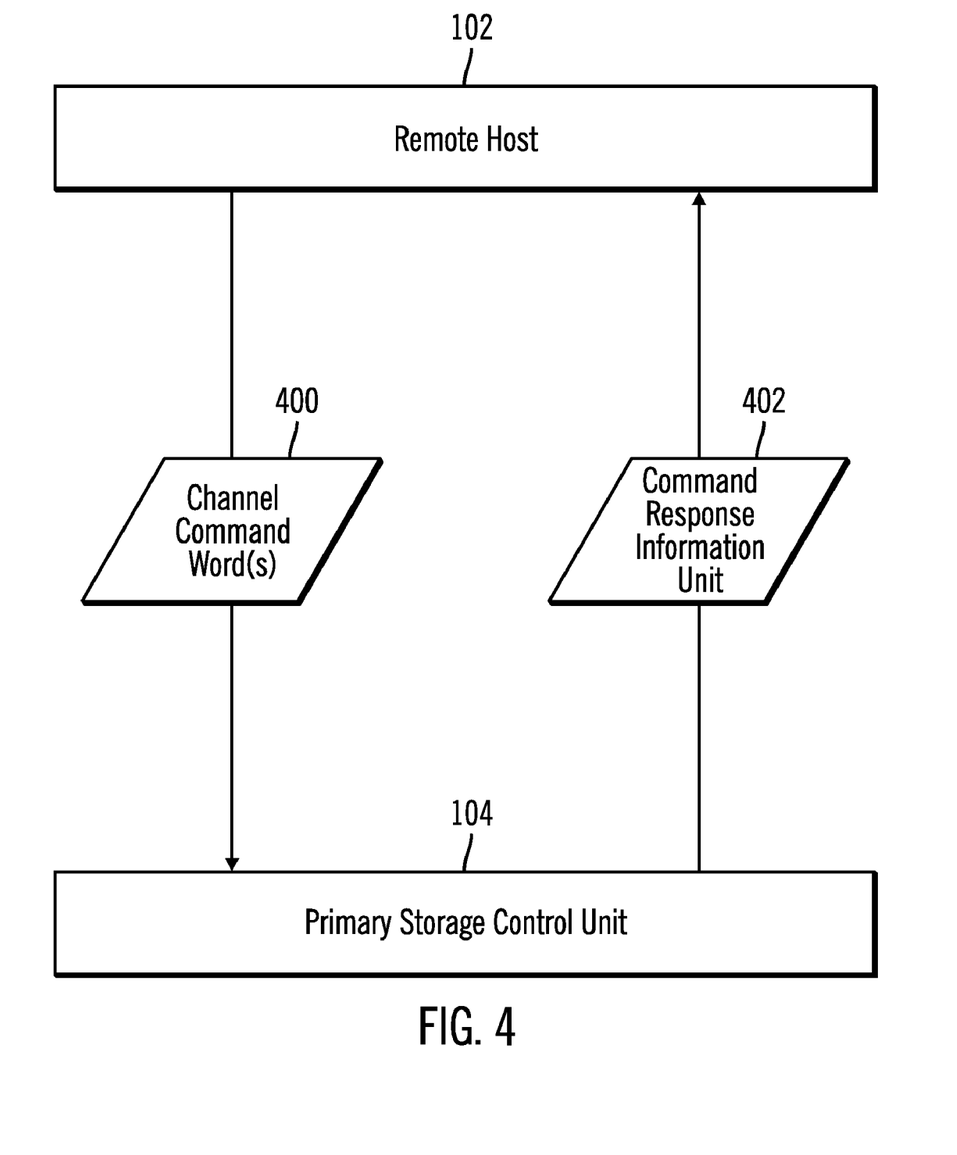
FIG. 4 illustrates a block diagram that shows communications between a remote host and a primary storage controller, in accordance with certain embodiments.

FIG. 4 illustrates a block diagram that shows communications between the remote host 102 and the primary storage controller 104, in accordance with certain embodiments implemented in the computing environment 100.

The remote host 102 is capable of sending one or more channel command words 400 in a sequence over a channel generated in accordance with the FICON protocol between the remote host 102 and the primary storage control unit 104. The primary storage control unit 104 may send a command response information unit 402 in response to certain channel command words 400. In certain embodiments by adjusting an IU pacing parameter, such as the IU pacing parameter 208, included in the command response information unit 402, the primary storage control unit 104 may modify the number of channel command words that may be in flight between the remote host 102 and the primary storage control unit 104.

Figure 5:
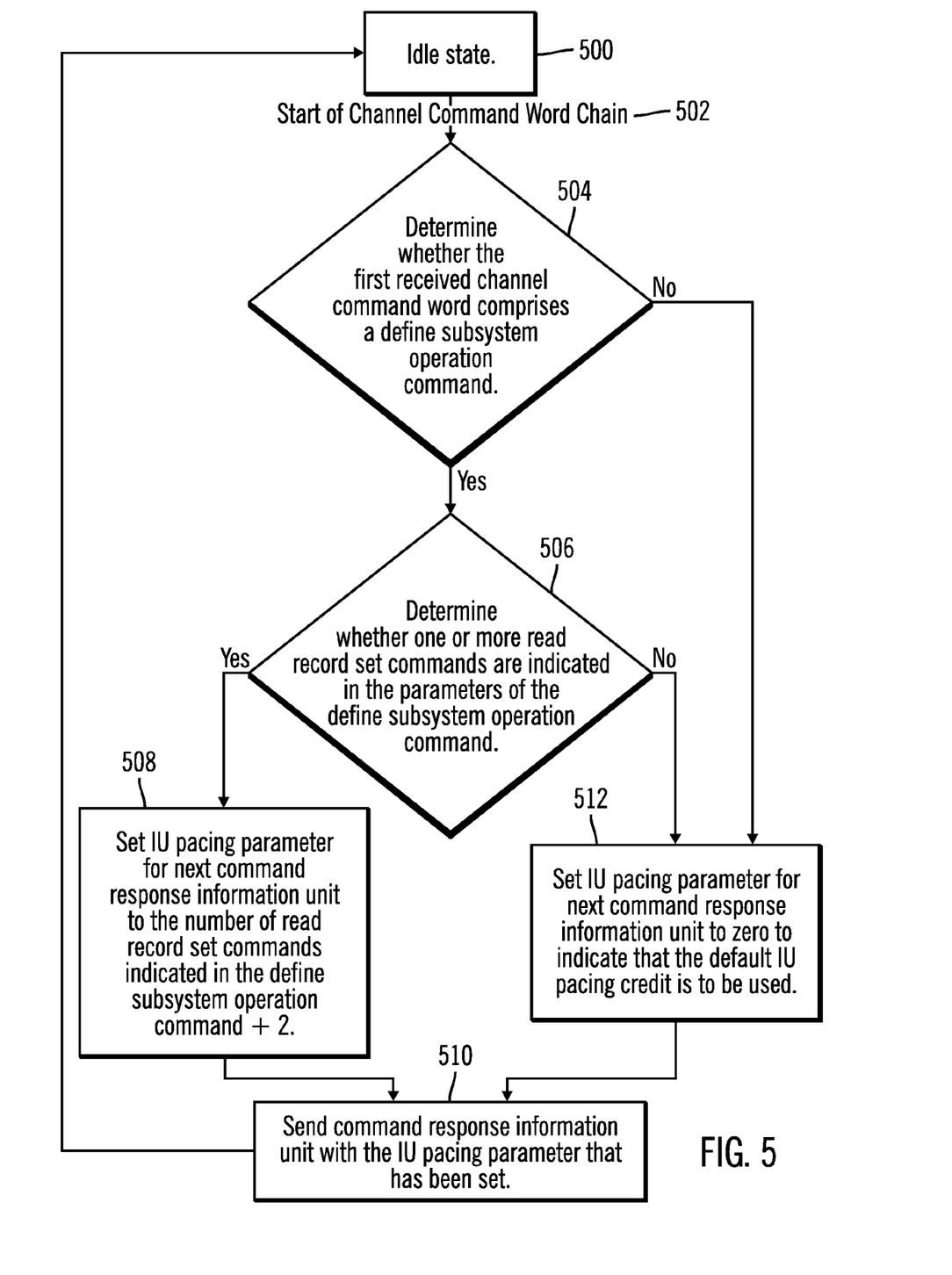
FIG. 5 illustrates a flowchart that shows operations for controlling information units in fibre channel communications, in accordance with certain embodiments.

FIG. 5 illustrates a flowchart that shows operations for controlling information units in fibre channel communications, in accordance with certain embodiments. Certain of the operations illustrated in FIG. 5 may be implemented in the primary storage control unit 104.

Control starts at block 500 where the channel formed between the remote host 102 and the primary storage control unit 104 over the fibre channel 108 is in idle state, and a channel command word chain starts (reference numeral 502).

Control proceeds to block 504, where the controller application 112 determines whether the first received command control word comprise a define subsystem operation command 302. If so, then the controller application 112 determines whether one or more read record set commands 304 are indicated in the parameters of the define subsystem operation command 302. The number of read record set commands 304 may indicate the number of read requests that are to follow from the remote host 102 to the primary storage control unit 104 during extended remote copy operations. The presence of the read record set commands 304 may also indicate that extended distance remote copy has been implemented over the fibre channel 108.

If the controller application 112 determines (at block 504) that one or more read record set commands 304 are included in the parameters of the define subsystem operation command 302, then in certain embodiments the controller application 112 sets (at block 508) the IU pacing parameter 208 for the next command response information unit 206 to be two more than the number of read record set commands 304 indicated in the define subsystem operation command 302. The two additional number beyond the number of read record set commands 304 are included in the IU pacing parameters because in certain extended remote copy implementations of the embodiment a number of additional commands, such as, Perform Subsystem Function commands and Read SubSystem Data commands, may be included at the end of the command chain from the remote host 102. In certain alternative embodiments, the controller application 112 may set the IU pacing parameter 208 to any other number in order to control the flow of channel command words in the FICON protocol.

The controller application 112 sends (at block 510) the command response information unit 206 with the IU pacing parameter 208. The number of channel command words in flight over the fiber channel 108 is adjusted based on the number of the IU pacing parameter 208 received by the host application 110, by setting the IU pacing credit 204 to the value of the IU pacing parameter 208. Control proceeds to block 500, where the channel is again in idle state after the number of channel command words indicated by the IU pacing credit 204 has been sent and the next control word chain starts (reference numeral 502).

If at block 504, the controller application 112 determines that the first command control word does not comprise a define subsystem operation command 302, then the controller application 112 sets (at block 512) the IU pacing parameter 208 for the next command response information unit to zero to indicate that the default IU pacing credit 204 is to be used. The controller application 112 sends (at block 510) the command response information unit 206 with the IU pacing parameter 208. In such a case, no more than sixteen channel command words may be in flight over the fiber channel 108 at any time.

If at block 506, the controller application 112 determines that one or more read record set commands are not indicated by the parameters of the define subsystem operation command 302, then the controller application 112 sets (at block 512) the IU pacing parameter 208 for the next command response information unit to zero to indicate that the default IU pacing credit 204 is to be used. The controller application 112 sends (at block 510) the command response information unit 206 with the IU pacing parameter 208. In such a case, no more than sixteen channel command words may be in flight over the fiber channel 108 at any time.

Therefore, FIG. 5 illustrates certain embodiments in which the IU pacing parameter 208 may be dynamically changed by a primary storage control unit 104 to modify the flow of information units within the FICON architecture, such that more than sixteen information units can be in flight from the remote host 102 to the primary storage control unit 104 at any point in time during extended remote copy. Certain embodiments avoid data rate droop caused by extra round trips required for long distance.

communications at exemplary distances of over 100 kilometers in certain default FICON implementations. Furthermore, certain embodiments do not need to use channel extenders with emulation capability to eliminate data rate droop.

Additional Embodiments Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Only Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and the "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 6:
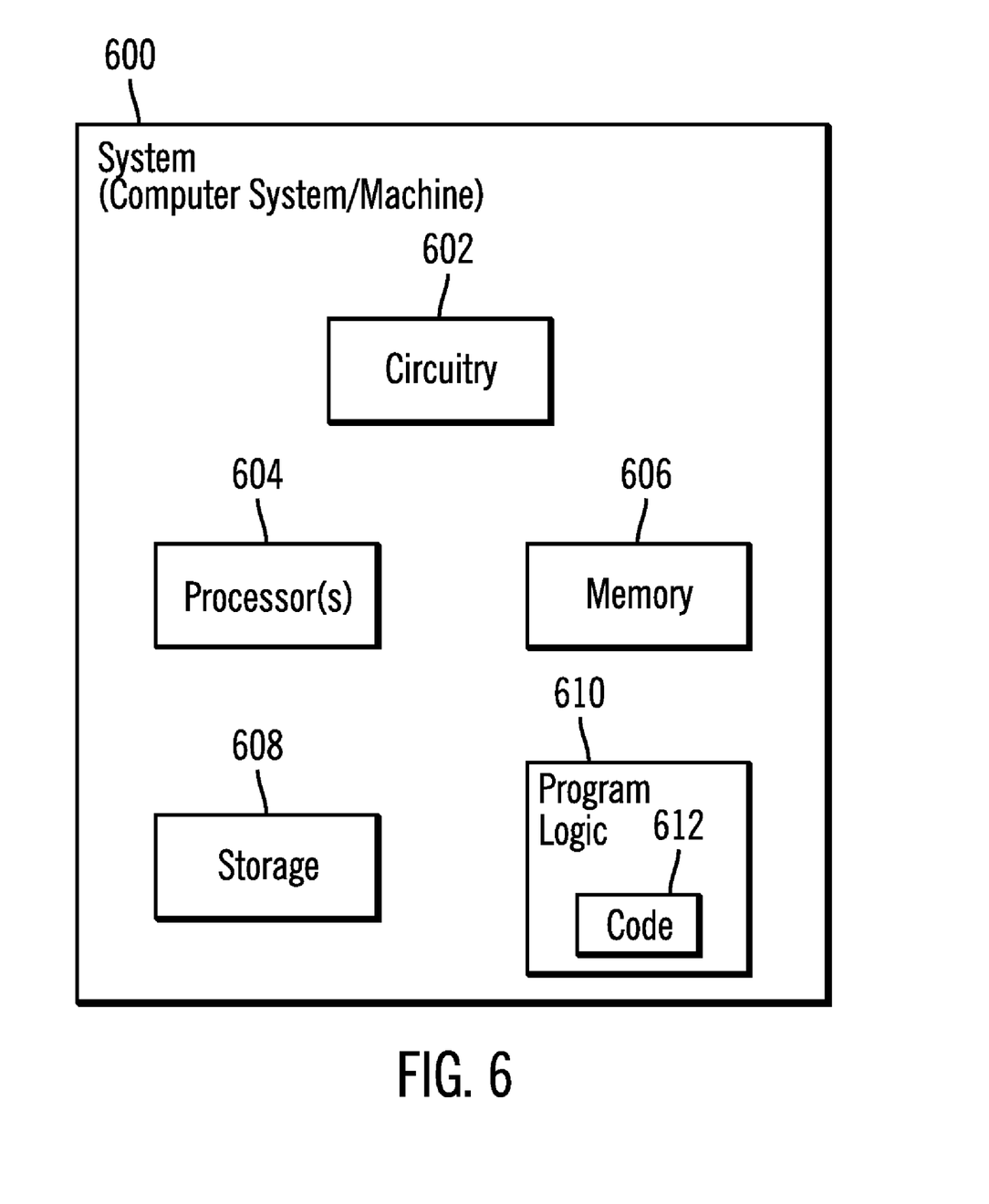
FIG. 6 illustrates the architecture of computing system, wherein in certain embodiments elements of the computing environment of FIG. 1 may be implemented in accordance with the architecture of the computing system.

FIG. 6 illustrates an exemplary computer system 600, wherein in certain embodiments the remote host 102, the primary storage controller 104, and the remote storage controller 106 of the computing environment 100 of FIG. 1 may be implemented in accordance with the computer architecture of the computer system 600. The computer system 600 may also be referred to as a system, and may include a circuitry 602 that may in certain embodiments include a processor 604. The system 600 may also include a memory 606 (e.g., a volatile memory device), and storage 608. Certain elements of the system 600 may or may not be found in the remote host 102, the primary storage controller 104, or the remote storage controller 106 of FIG. 1. The storage 608 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 608 may comprise an internal storage device, an attached storage device and/or network accessible storage device. The system 600 may include a program logic 610 including code 612 that may be loaded into the memory 606 and executed by the processor 604 or circuitry 602. In certain embodiments, the program logic 610 including code 612 may be stored in the storage 608. In certain other embodiments, the program logic 610 may be implemented in the circuitry 602. Therefore, while FIG. 6 shows the program logic 610 separately from the other elements, the program logic 610 may be implemented in the memory 606 and/or the circuitry 602.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIG. 6 may be performed in parallel as well as sequentially. In alternative embodiments, certain of the operations may be performed in a different order, or modified or removed.

Furthermore, any of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-6 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
   receiving, at a primary storage control unit, an information unit from a remote host over a fibre channel connection; and
   adjusting, by the primary storage control unit, an information unit pacing parameter included in a response sent from the primary storage control unit to the remote host, wherein the information unit pacing parameter indicates the number of information units that the remote host is allowed to send to the primary storage control unit without waiting for any additional response from the primary storage control unit, wherein the information unit is a channel command word in a fibre connect protocol, and wherein the received channel command word starts a channel command word chain, the method further comprising:
   (i) determining whether the channel command word comprises a define subsystem operation command that defines a subsystem operation for extended remote copy operations;
   (ii) determining the number of read record set commands associated with the define subsystem operation command, wherein a read record set command corresponds to a read request, wherein the number of read record set commands indicates the number of read requests that are to follow from the remote host to the primary storage control unit during the extended remote copy operations; and
   (iii) setting the information unit pacing parameter to a value that is two more than the number of read record set commands to allow the remote host to send remaining information units without requiring the additional response from the primary storage control unit.

2. The method of claim 1, wherein the information unit pacing parameter is set to a number that is greater than sixteen, and wherein the number of read record set commands exceed 150 channel command words.

3. The method of claim 1, wherein setting the information unit pacing parameter to the value that is two more than the number of read record set commands causes the value to be large enough to allow the remote host to send the remaining information units without requiring the additional response from the primary storage control unit, wherein the channel command word chain from the remote host ends with a perform subsystem function command and a read subsystem data command, and wherein the information unit pacing parameter is set to the value that is two more than the number of read record set commands to account for the perform subsystem function command and the read subsystem data command that are included at the end of the channel command word chain.

4. The method of claim 3, the method further comprising:
   setting the information unit pacing parameter to zero, in response to determining that the channel command word does not comprise a define subsystem operation command, wherein by setting the information unit pacing parameter to zero a default information unit pacing credit is used in the fibre channel connect protocol used for communicating between the remote host and the primary storage control unit.

5. The method of claim 1, wherein the remote host performs extended remote copying of data from the primary storage control unit to a remote storage control unit, wherein the remote host is geographically separated from the primary storage control unit by a distance of over a hundred kilometers, and wherein a distance between the remote host and the primary storage control unit exceeds a maximum distance supported by fibre channel architecture by using fibre channel extension solutions.

6. A method for deploying computing infrastructure, comprising integrating computer-readable code into a primary storage control unit, wherein the code in combination with the primary storage control unit is capable of performing:
   receiving, at the primary storage control unit, an information unit from a remote host over a fibre channel connection; and
   adjusting, by the primary storage control unit, an information unit pacing parameter included in a response sent from the primary storage control unit to the remote host, wherein the information unit pacing parameter indicates the number of information units that the remote host is allowed to send to the primary storage control unit without waiting for any additional response from the primary storage control unit, wherein the information unit is a channel command word in a fibre connect protocol, and wherein the received channel command word starts a channel command word chain, the method further comprising:
  (i) determining whether the channel command word comprises a define subsystem operation command that defines a subsystem operation for extended remote copy operations;
  (ii) determining the number of read record set commands associated with the define subsystem operation command, wherein a read record set command corresponds to a read request, wherein the number of read record set commands indicates the number of read requests that are to follow from the remote host to the primary storage control unit during the extended remote copy operations; and
  (iii) setting the information unit pacing parameter to a value that is two more than the number of read record set commands to allow the remote host to send remaining information units without requiring the additional response from the primary storage control unit.

7. The method for deploying computing infrastructure of claim 6, wherein the information unit pacing parameter is set to a number that is greater than sixteen, and wherein the number of read record set commands exceed 150 channel command words.

8. The method for deploying computing infrastructure of claim 6, wherein setting the information unit pacing parameter to the value that is two more than the number of read record set commands causes the value to be large enough to allow the remote host to send the remaining information units without requiring the additional response from the primary storage control unit, wherein the channel command word chain from the remote host ends with a perform subsystem function command and a read subsystem data command, and wherein the information unit pacing parameter is set to the value that is two more than the number of read record set commands to account for the perform subsystem function command and the read subsystem data command that are included at the end of the channel command word chain.

9. The method for deploying computing infrastructure of claim 8, wherein the code in combination with the computing system is further capable of performing:
  setting the information unit pacing parameter to zero, in response to determining that the channel command word does not comprise a define subsystem operation command, wherein by setting the information unit pacing parameter to zero a default information unit pacing credit is used in the fibre channel connect protocol used for communicating between the remote host and the primary storage control unit.

10. The method for deploying computing infrastructure of claim 6, wherein the remote host performs extended remote copying of data from the primary storage control unit to a remote storage control unit, wherein the remote host is geographically separated from the primary storage control unit by a distance of over a hundred kilometers, and wherein a distance between the remote host and the primary storage control unit exceeds a maximum distance supported by fibre channel architecture by using fibre channel extension solutions.

* * * * *